United States Patent Office 3,351,317
Patented Nov. 7, 1967

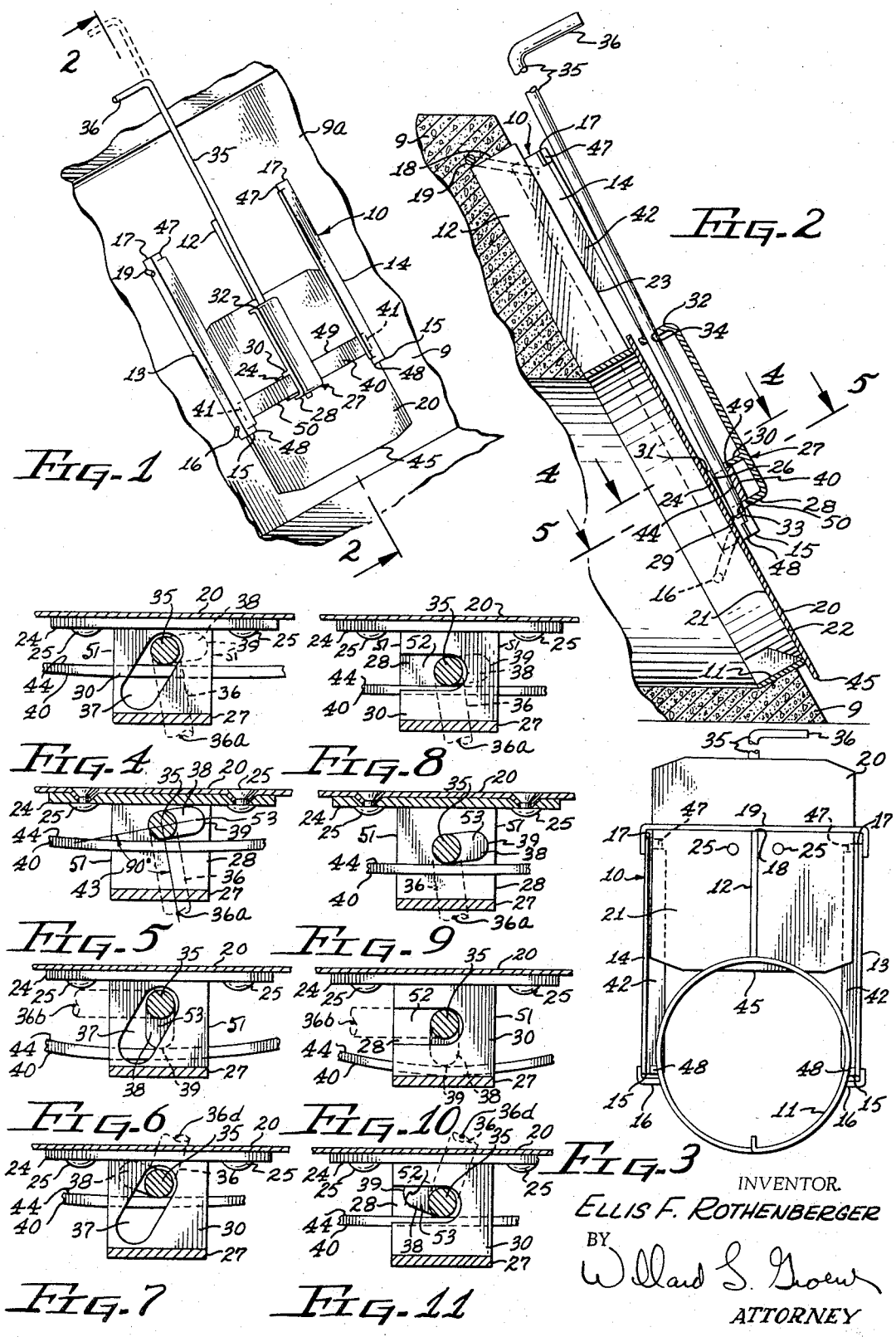

3,351,317
IRRIGATION DITCH GATE VALVE
Ellis F. Rothenberger, P.O. Box 2002
Fullerton, Calif. 92633
Filed May 20, 1965, Ser. No. 457,293
1 Claim. (Cl. 251—147)

ABSTRACT OF THE DISCLOSURE

An irrigation gate valve having a single handle control element which may be moved to a sliding adjusting position of the valve, to a second position of locking of the valve in any raised or lowered position, and a third position angularly related to the other positions for pulling the single handle control element and parts of the valve apart or reassembling them for the valve structure mounted in the irrigation ditch lining.

---

This invention pertains to certain new and useful improvements in an irrigation valve which is particularly well adapted to efficient and reliable use when employed in an irrigation ditch, at the end of a conduit, pipe or the like.

This invention is directed to improvements in irrigation ditch gate valves such as shown in my Patent 2,835,469 issued May 20, 1958 and in copending application Serial No. 348,565, filed March 2, 1964 now Patent No. 3,269,-690 granted August 30, 1966.

One of the objects of this invention is to provide an irrigation ditch gate valve of improved construction to facilitate installation and provide more efficient operation and servicing of the valve under all operating conditions.

Another object of this invention is to provide an irrigation ditch gate valve having a gate and operating handle structure that can be readily assembled and dissembled without the use of fastenings and tools relative to the valve seat apparatus fixed in the irrigation ditch lining.

Still another object is to provide an irrigation ditch gate valve, gate disc or plate that cannot be accidently disengaged from the valve seat member unless the gate is in fully retracted open position.

Another object is to provide an irrigation ditch gate valve which has a normal spring tension friction when moving the gate to various adjusted positions so that the valve will not slip from adjusted positions and a locking arrangement to positively clamp the valve in closed or any adjusted position from a single manipulating handle of the valve.

Still another object is to provide a gate valve having a manipulating handle rod that cannot be accidently removed from the valve assembly during the normal use and operation of the valve.

Further features and advantages of this invention will appear from a detailed description of the drawings in which:

FIG. 1 is a front perspective of an irrigation ditch gate valve incorporating the features of this invention.

FIG. 2 is an enlarged fragmentary sectional view on the line 2—2 of FIG. 1.

FIG. 3 is a rear elevation of the irrigation ditch gate valve.

FIG. 4 is an enlarged fragmentary sectional view on the line 4—4 of FIG. 2.

FIG. 5 is an enlarged fragmentary sectional view on the line 5—5 of FIG. 2.

FIG. 6 is an enlarged fragmentary sectional view similar to FIG. 5 showing the gate in clamped position.

FIG. 7 is an enlarged fragmentary sectional view similar to FIG. 5 but showing the gate in another unclamped position.

FIG. 8 is an enlarged fragmentary sectional view similar to FIG. 4 showing a modification of the gate valve thereof, indicated at the line 4—4 of FIG. 2.

FIG. 9 is an enlarged fragmentary sectional view similar to FIG. 8 showing the gate in unclamped position.

FIG. 10 is an enlarged fragmentary sectional view similar to FIG. 9, showing the gate in clamped position.

FIG. 11 is an enlarged fragmentary sectional view similar to FIGS. 9 and 10 but the gate in another unclamped position.

As an example of one embodiment of this invention there is shown an irrigation ditch gate valve having a frame 10 appropriately imbedded in the concrete lining 9 comprising a valve seat ring 11 to which is fixed the upwardly extending radially disposed guide leg 12. Laterally spaced L-shaped guide rails 13 and 14 extending up each side of the valve seat ring 11 and rigidly attached at their lower ends 15 by connecting pieces 16 and rigidly connected at their upper ends 17 to the top 18 of the guide leg 12 by transverse rod 19.

The gate 20, which may take the form of a disc or plate is adapted to slide up and down with its rear or down stream surface 21 sliding on the valve seat edge 22 of the ring 11 and the forward edge 23 of the guide leg 12, and is suitably fixed to the plate 24 by suitable rivets or screws 25. Fixed to the front face 26 of the plate 24 is the manipulating handle support member 27 having a turned-in portion 28 rigidly fixed adjacent the lower edge 29 of the plate 24 and having an intermediate piece 30 rigidly fixed adjacent to the upper edge 31 of the plate 24 and at the upper end of the handle support member 27 is a turned-in portion 32. Bearing bores 33 and 34 are formed respectively in the turned-in portions 28 and 32 in which is rotatably supported the manipulating handle rod 35 having the radially disposed integral handle 36.

The rod 35 passes through one end of an angularly disposed elongated slot 37 formed in the intermediate piece 30, as best shown in FIGS. 4, 6 and 7. Fixed to the rod 35 between the turned-in portion 28 and the intermediate piece 30 is the cam piece 38 having the cam surface 39. The flat control spring 40 extends and is laterally guided between the turned-in portion 28 and the intermediate piece 30 and extends over the rod 35 on the opposite side thereof from the front face of the plate 24 and has its outer end surfaces 41 adapted to engage the surfaces 42 of the guide rails 13 and 14. It will be noted, FIGS. 4–7, that the handle 36 extends at right angles to the cam piece 38 as indicated at 43.

In FIGS. 4 and 5, the handle 36 is adjusted to a straight out position 36a extending substantially at right angles to the surface 9a of the ditch lining 9 at which time the cam piece 38 is flat against the surface 26 of the plate 24 and the inner surface 44 of the control spring 40 while the end surfaces of the cam piece 38 are confined between the turned-in portion 28 and the intermediate piece 30 so as to restrain relative axial movement of the rod 35 in the bores 33 and 34 of the handle support member 27. Under this conditions the control spring is slightly cambered to exert light sliding pressure at its ends against the surfaces 42 of the guide rails 13 and 14 so that the gate 20 may be readily moved up and down by grasping the handle 36 to position the gate 20 for any desired amount of opening of the valve seat ring 11. The control spring pressure under these conditions is such that the gate will remain in any desired adjusted position when the handle 36 is released but still can be easily slid up and down while maintaining adequate contact at all times of the down stream surface 21 of the gate 20 with the valve seat edge 22 so that the bottom edge 45 can cut through silt, sticks and trash caught in the ring opening, when the gate is pushed down to shut-off the valve.

For any up and down adjusted position for the gate 20, the gate may be locked to the frame 10 by moving the handle 36 to position 36b as shown in FIG. 6 whereupon the cam surface 39 rides up against the inner surface 44 of the control spring 40 to cause it to exert maximum pressure against the surface 42 of the guide rails 13 and 14 so the gate cannot be moved up and down on the ring seat 22 or edge 23 of the guide leg 12 at which time the handle 36 extends substantially parallel to the ditch lining surface 9a. It is important to note that the guide leg absorbs the forces on the gate under these conditions when the gate is locked in the upper portions of its travel so as to prevent springing of the gate.

The gate 20 may also be released for vertical adjustment by swinging the handle 36 to position 36d, FIG. 7, with the cam piece 38 then swung to the opposite side of rod 35 from that shown in FIGS. 4 and 5.

When it is desired to remove the gate 20 from the frame 10, the gate is moved to fully open position at the top of its travel and the handle 36 rotated to a released position 36a or 36d, FIGS. 4 and 7. This causes the cam piece to again release locking pressure on the springs 40. It will be noted that in either release position of the cam piece it is not in alignment with the angularly disposed slot 37 formed in the intermediate piece 30. Under these conditions the handle 36 and rod 35 cannot be pulled upwardly out of the space between the turned-in piece 28 and the intermediate piece 30. In either releasing position 36a or 36d of the handle 36 pressure on the surface 44 of the spring 40 is released so that the spring may be passed by the upper stop surfaces 47 on the guide rails 13 and 14 to allow the gate to be pulled from the frame 10. Stops 47 normally engage the upper edge 49 at the ends of the spring 40 to limit the upper limit of travel of the gate while stop surfaces 48 on the lower ends of the rails 13 and 14 engage the bottom edge 50 of the spring 40 to limit the lower or closed position of travel of the gate 20. The bore 34 in the handle support member is arranged of such size that the rod 35 and its handle 36 may be pulled down through it with the lower portion of the rod 35 and cam piece 38 extending past the side edges 51 of the turned-in piece 28 and intermediate piece 30. With the control spring 40 removed from the gate structure, the control rod handle 36 may be swung to a position of alignment of the cam piece 38 with the angularly disposed slot 37 the control rod may be axially inserted or removed from the gate structure.

In FIGS. 8, 9, 10 and 11 is shown the same operative structure as that shown and described in FIGS. 4, 5, 6 and 7 respectively, except that in place of the angularly disposed elongated slot 37 there is provided an elongated notch 52 formed in the intermediate piece 30 and extending radially outwardly of the rod 35 substantially parallel to the surface 26 of the plate 24. As seen in FIGS. 8 and 11, when in either released position 36a and 36d of the handle 36 the axial withdrawal of the rod 35 is restrained by the engagement of the upper side 53 of the cam piece 38 engaging the underside of the intermediate piece 30, as in the case of the angularly disposed slot 37 of FIGS. 4 to 7. Thus, in either arrangement of the angularly disposed elongated slot 37 or the elongated notch 52, the control rod 35 cannot be pulled from normal operative position when its handle 36 is swung to either released position for vertically positioning the gate 20.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

An irrigation ditch gate valve comprising in combination:

(A) a frame adapted to be secured in the lining of an irrigation ditch including, (B) a valve seat ring having a valve seat, (C) parallel spaced guide rails to receive said valve gate joined rigidly to diametrically opposite sides of said ring, (D) and a guide leg fixed to and extending radially upwardly from said ring having a forward edge lying in the plane of said valve seat, (E) a valve gate having a down stream surface slidingly engaging said valve ring seat and forward edge of said guide leg, (F) a single handle control device having a manipulating rod rotatably journaled on said valve gate including a radially disposed handle fixed at its upper end, (G) a control spring normally tensioned to apply pressure to said valve gate to maintain it in operative contact with said valve seat while allowing adjustment of the amount of opening of said valve ring, (H) means on said valve gate adapted to support said control spring midway its ends so that its free outer ends lightly yieldingly slidingly engage said guide rails, (I) a radially disposed cam piece fixed to said manipulating rod and disposed at right angles to said handle of said rod actuable by said single handle control device to increase the tension in said control spring to lock said valve gate in any desired position against relative movement on said frame, (J) said cam piece on said handle being arranged to be moved by rotation of said manipulating rod by said handle to a first position of released normal lightly yielding sliding contact of said control spring with said guide rails, to a second position of increased tension to lock said valve against adjustment, and to a third position of partially increased tension for the axial withdrawal of said handle, rod and cam piece from said valve gate when the ends of said control spring free outer ends have been moved upwardly above the top ends of said guide rails to permit removal thereof from the gate assembly, (K) said last mentioned position being controlled by a slot angularly disposed relative to the position of said cam piece when moved to said first or second position of said control rod and aligned with said cam piece when moved to said third position by said control rod in the valve assembly frame so as to receive and pass said cam piece when said rod is presented in said third position to or removed from said valve assembly.

References Cited

UNITED STATES PATENTS

| | | | |
|---|---|---|---|
| 496,239 | 4/1893 | Watson | 251—204 X |
| 2,472,677 | 6/1949 | Phillips | 251—176 |
| 2,652,946 | 9/1953 | Beatty | 251—204 X |
| 2,835,469 | 5/1958 | Rothenberger | 251—147 |
| 3,061,266 | 10/1962 | Hoffknecht | 251—147 |
| 3,269,690 | 8/1966 | Rothenberger | 251—147 |

CLARENCE R. GORDON, *Primary Examiner.*